United States Patent [19]

Merkle

[11] Patent Number: 5,158,412

[45] Date of Patent: Oct. 27, 1992

[54] SOLIDS CHARGER

[75] Inventor: Frank P. Merkle, Hanover, Ill.

[73] Assignee: Merkle Engineers, Inc., Galena, Ill.

[21] Appl. No.: 636,041

[22] Filed: May 20, 1991

[51] Int. Cl.$^5$ .............................................. C03B 3/00
[52] U.S. Cl. ................................. 414/166; 414/182; 65/335; 65/27
[58] Field of Search .............. 414/147, 152, 154, 156, 414/160, 163, 164, 165, 166, 167, 172, 180, 182, 188, 192, 198, 207; 65/27, 135, 335; 187/8.69, 8.59; 432/239, 241

[56] References Cited

U.S. PATENT DOCUMENTS

| | | |
|---|---|---|
| 1,171,414 | 2/1916 | Carpenter et al. .............. 414/182 X |
| 2,533,826 | 12/1950 | Lyle ................................... 414/166 X |
| 3,780,889 | 12/1973 | Frazier et al. ....................... 414/166 |
| 4,004,903 | 1/1977 | Daman et al. .................. 414/166 X |
| 4,226,564 | 10/1980 | Takahashi et al. ................... 414/166 |
| 4,545,717 | 10/1985 | Wittler et al. ....................... 414/166 |
| 4,983,206 | 1/1991 | Trunzo . |

Primary Examiner—Frank E. Werner
Attorney, Agent, or Firm—Speckman & Pauley

[57] ABSTRACT

A solids charger of the type having a main support frame with a solids supply chute thereabove feeding solids to a vertically and angularly adjustable, with respect to the horizontal, reciprocable charger plate positioned under the solids supply chute for receiving solids toward its rear end and feeding the granular solid materials to a reactor from its front end. The improvement in such a solids charger of a reciprocable charger plate reciprocably mounted in fixed angular relation to a charger plate support, reciprocating drive means fixedly mounted to the charger plate support and connected by an adjustable connecting rod with the rear end of the reciprocable charger plate, the connecting rod reciprocating generally parallel to the plane of the charger plate. The improvement includes a plurality of jacks connected at their one end to the main support frame and at their opposite end to the charger plate support with front jacks beneath and pivotably connected to a front region of the charger plate support and rear jacks beneath and pivotably connected to a rear region of the charger plate support for independently raising and lowering the front and rear ends of the charger plate.

16 Claims, 4 Drawing Sheets

SOLIDS CHARGER

BACKGROUND OF THE INVENTION

1. Field of the Invention

This invention relates to charging apparatus for introducing granular solid materials into a reactor, such as, introduction of raw batch material into a glass melter.

2. Description of Related Art

Batch chargers for feeding raw batch material to glass furnaces are well known as exemplified by U.S. Pat. No. 4,983,206. The 4,983,206 patent teaches a batch charger wherein the charger plate is supported on an array of sets of rollers, each set of rollers including a front and a rear roller mounted to a roller frame and each roller frame for each set of rollers having a jack positioned beneath its front and rear portions for independently raising and lowering the front and rear end of the charger plate. The batch charger shown in the 4,983,206 patent has three roller frames across its width and thus requires six jacks for adjustment. The 4,983,206 patent teaches that the adjustable charger plate crank assembly and its drive means for reciprocating the charger plate are affixed to the frame structure of the feeder. Therefore, both vertical and angular movement of the charger plates is limited especially in extreme positions, due to introduction of force vectors which ar angular with respect to the plane of reciprocation of the charger plate.

SUMMARY OF THE INVENTION

It is an object of this invention to provide a solids charger which overcomes at least some of the above disadvantages of prior batch chargers.

It is another object of this invention to provide a solids charger in which the vertical and angular adjustment of a reciprocable charger plate with respect to the horizontal is simplified and to provide a greater range of adjustment.

Still another object of this invention is to provide a solids charger requiring fewer jacking means for vertical and angular adjustment of a reciprocable charger plate with respect to the horizontal.

Yet another object of this invention is t provide a solids charger having its reciprocating drive means fixedly mounted to a charger plate support means by which the charger plates are supported to provide connecting rod reciprocation generally parallel to the plane of the charge plate.

The above and other objects which will become apparent upon reading the preferred embodiments of the invention as set forth below are achieved by a reciprocable charger plate being reciprocably mounted in fixed angular relation to a charger plate support means; reciprocating drive means fixedly mounted to the charger plate support means and connected by an adjustable connecting rod means with the rear end of the reciprocable charger plate; and jacking means connected at their one end to the main support frame of the solids charger and at their opposite end to the charger plate support, the jacking means comprising front jacking means beneath and pivotably connected to a front region of the charger plate support and rear jacking means beneath and pivotably connected to a rear region of the charger plate support for independently raising and lowering the front and rear ends of the charger plate support. According to the present invention, all charger plate rollers which support and guide the charger plate are mounted to a single charger plate support which may be vertically and angularly adjusted with respect to the horizontal by jacks beneath appropriate locations of the charger plate to effect the desired adjustment. The charger plate support may be adjusted by a plurality of front jacks and a plurality of rear jacks for most applications two front jacks and two rear jacks. The charger plate support may also be adjusted by a plurality of front jacks and a single rear jack, for most applications two front jacks and a single rear jack which allows adjustment angularly both in a front-to-rear manner and in a side-to-side manner to profile the charge as desired across the width of the reactor.

BRIEF DESCRIPTION OF THE DRAWING

The above objects and advantages of this invention will become further apparent upon reading of the detailed description of preferred embodiments in reference to the drawing wherein.

DESCRIPTION OF PREFERRED EMBODIMENTS

Figure 1:
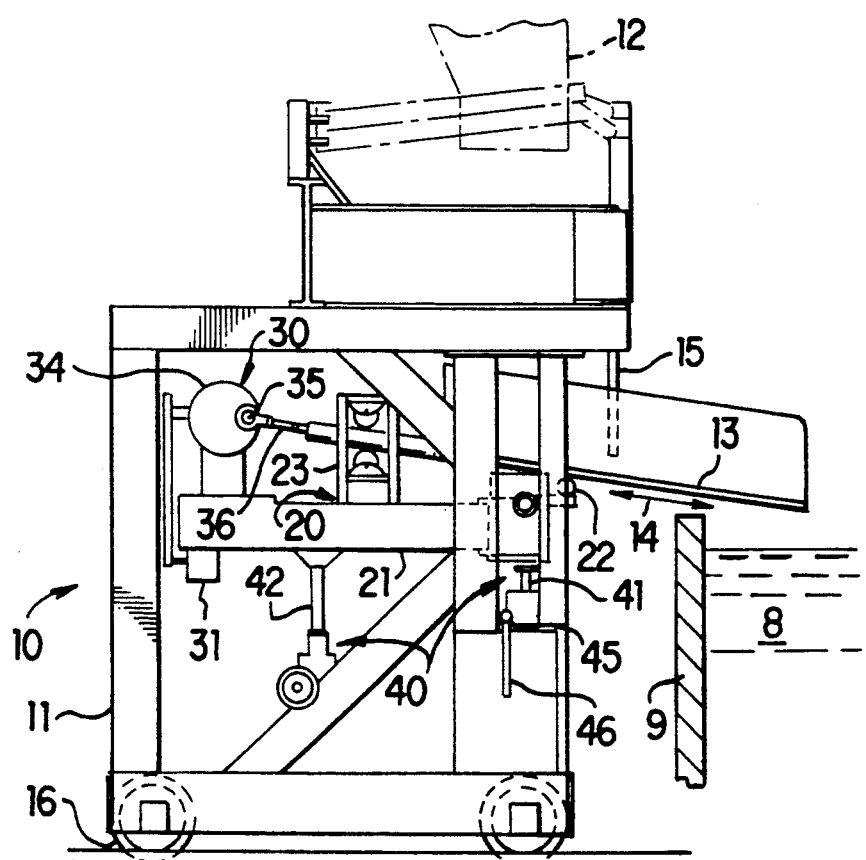
FIG. 1 is an end view of a solids charger according to one embodiment of this invention.

Referring to FIG. 1, solids charger 10 is shown adjacent an opening in reactor 9. Solids supply chute 12 feeds granular solid material to the rear end of reciprocable charger plate 13 which is reciprocated in the direction indicated by arrow 14 to cause flow of the granular solid material downwardly to the front end of charger plate 13 and to drop into reaction material 8 within reactor 9. In many chemical processes, such as glass making, the manner of feeding granular solid raw material to the reaction mixture is important. In glass making a batch charger is used to feed raw batch into a continuously operating glass furnace or melter. The batch charger feeds raw batch into one end of the furnace to maintain the desired level as molten glass is withdrawn from the opposite end of the furnace. The rate of melt is at least partially determined by the size and shape of the piles of batch that are fed to the liquid mix in the furnace. This is partially controlled by the angle of the charger plate as well as the height of the charger plate from the top surface of the molten glass in the furnace. It may also, on some occasions, be desired to control the profile across the width of the charger plate of the material dropped from the front end of the charger plate.

By the terminology "granular solids" as used throughout this specification and claims is meant solid particulate material in any shape and size suitable for movement on a reciprocating downwardly angled charger plate, including powder material, larger generally spherical particles and non-spherical particles or agglomerates such as cullet of glass. While the description of preferred embodiments will be primarily directed to glass batch chargers, it will be recognized that the solids charger of this invention is applicable to feeding solids to a wide variety of other chemical and/or physical reactions. By the terms "reaction" and "reactor" as used throughout this specification and claims is meant any chemical and/or physical reaction and vessel for its conduct, such as combustion and melting.

Figure 2:
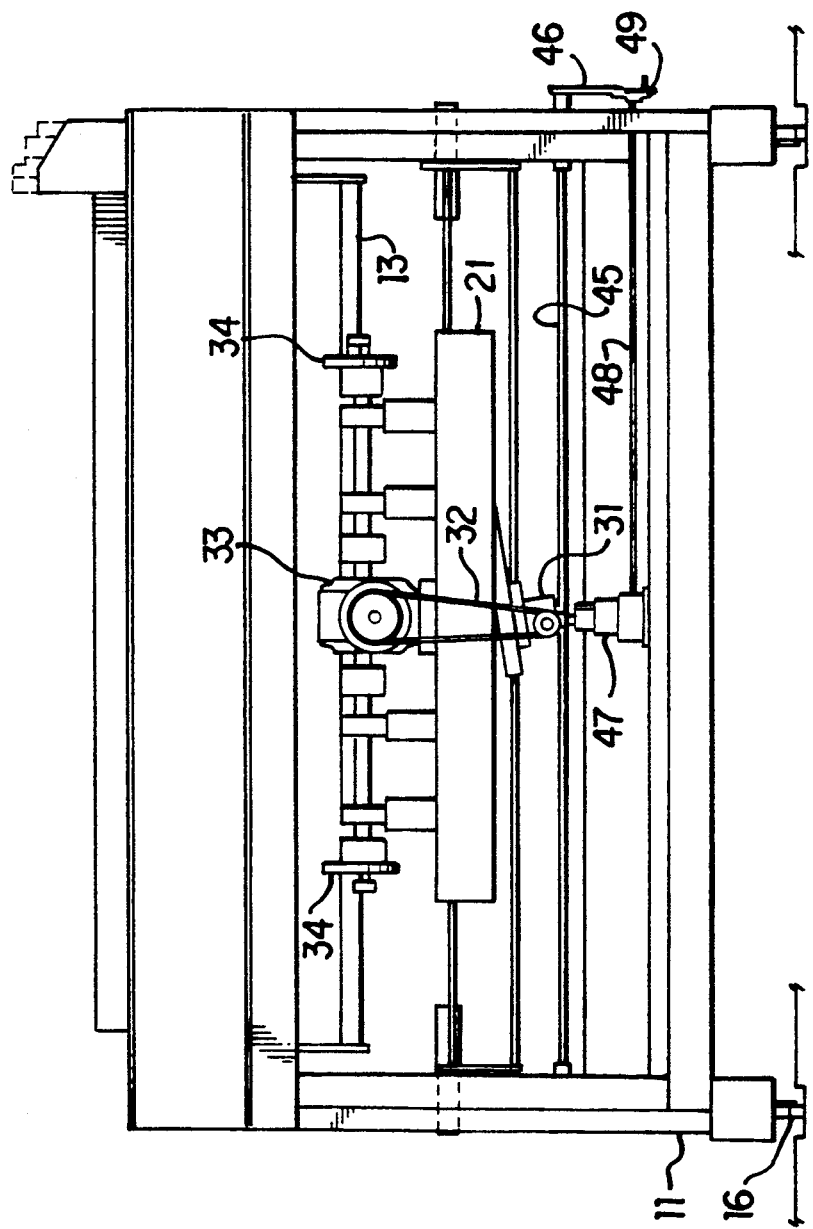
FIG. 2 is an aisle side elevation of the solids charger shown in FIG. 1.

As shown in the drawing, solids charger 10 has main support frame 11 mounted on wheels 16 for travel toward and away from reactor 9. Reciprocable charger plate 13 is reciprocably mounted in fixed angular relation to charger plate support means generally shown as 20. Charger plate support means 20 comprises generally flat support structure 21 upon which are mounted suitable sets of front rollers 22 for support of charger plate 13 and rear roller means 23 shown including lower rear rollers 24 and upper rear rollers 25 which may serve to respectively support and guide charger plate 13. These rollers and their contact with charger plate 13 may be effected by any roller means known to the art, such as rollers against rollers, rollers against a track guide or the like. Reciprocating drive means 30 is fixedly mounted to charger plate support means 20 and, as shown in the drawing, comprises motor 31 connected by belt drive 32 to speed reducer 33 which drives adjustable eccentric drive 34. The adjustability of the eccentric is effected by placement of pin 35, which pivotally holds the rear end of connecting rod 36, in a desired location relative to the center of rotation of adjustable eccentric drive 34. Any suitable drive means known to the art to provide reciprocating force to connecting rod 36 may be used in the solids charger of this invention as long as it is fixedly mounted to charger plate support means 20. Connecting rod 36 is joined at its forward end to the rear end or a bracket extending from the rear end of reciprocable charger plate 13. As shown in FIG. 2, a plurality of adjustable eccentric drives 34 may drive a plurality of connecting rods 36, dependent mainly upon the width of reciprocable charger plate 13 in the particular solids charger. Reciprocating drive means 30 and reciprocable charger plate 13 can be mounted in fixed relation with respect to charger plate support means 20 so that connecting rod 36 reciprocates generally parallel to the plane of reciprocable charger plate 13. As shown in the drawing, connecting rod 36 is shown reciprocating in about the same plane as reciprocable charger plate 13 since connecting rod 36 is pivotably connected to reciprocable charger plate 13 in the plane of the plate, which is a preferred embodiment. It is readily apparent that the connection of connecting rod 36 to reciprocable charger plate 13 could also be made somewhat offset from the plane of reciprocable charger plate 13 and retain the major benefits of this invention. Thus, the reciprocation of connecting rod 36 is generally parallel to the plane of reciprocable charger plate 13, thereby eliminating, or at least considerably reducing, the vertical force vectors transmitted from the connecting rod to the reciprocable charger plate in charger apparatus wherein the reciprocating drive means and the charger plate are mounted in a fashion such that their geometry changes with vertical and angular adjustments of the charger plate. Such separate mounting of the reciprocating drive means and reciprocable charger plate also limits both the vertical and angular adjustments of the charger plate.

Figure 3:
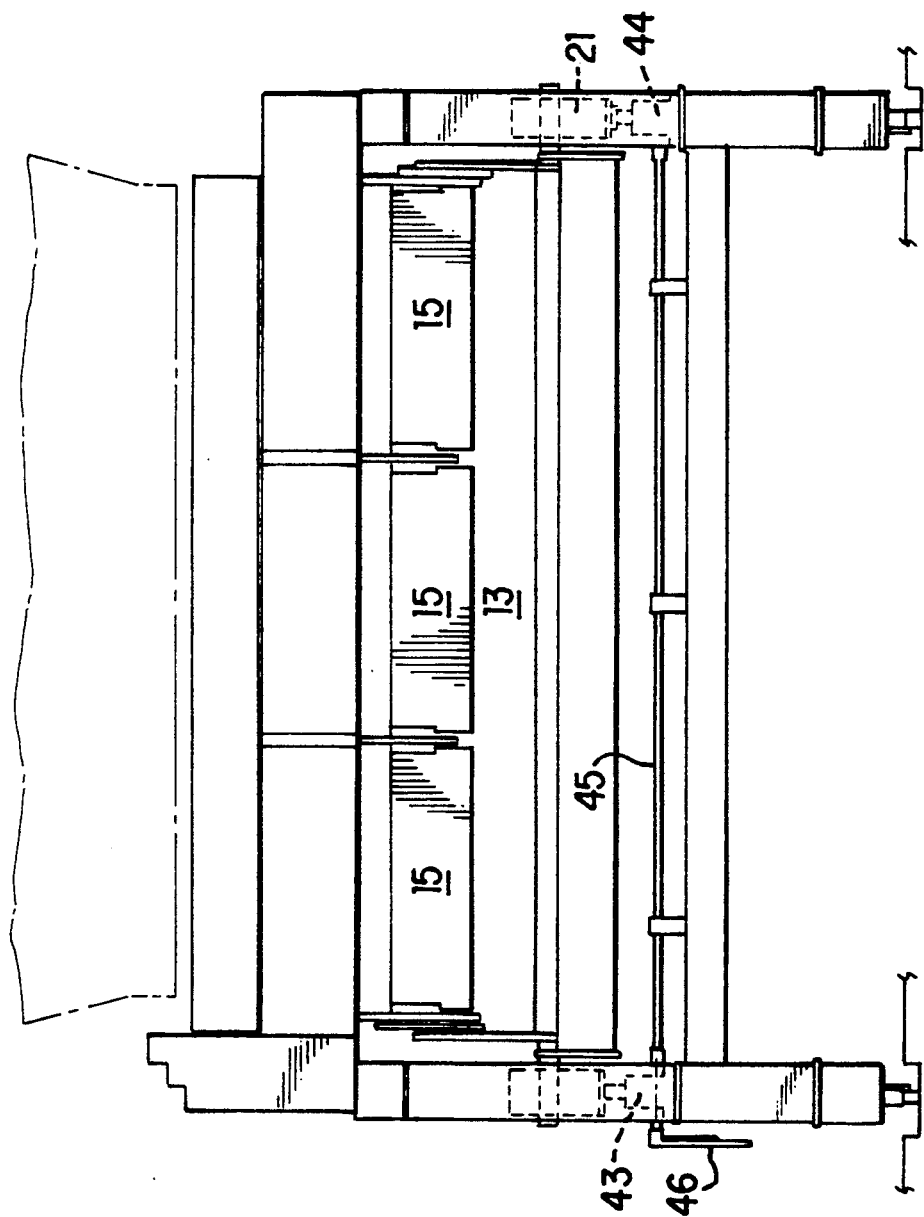
FIG. 3 is a reactor side elevation of the solids charger shown in FIG. 1.
Figure 4:
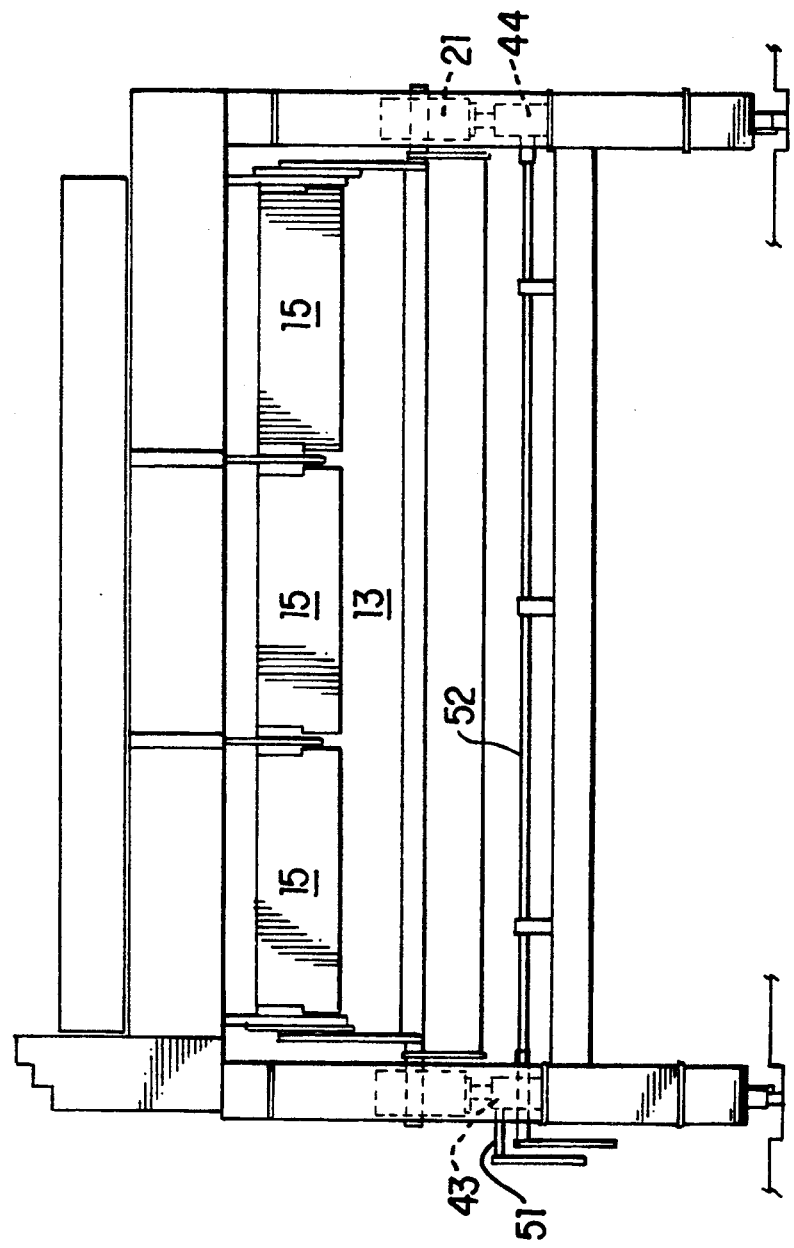
FIG. 4 is the same elevation of the solids charger as FIG. 3 showing front jacks individually controlled.

Vertical and angular adjustment of the charger plate is achieved by jacking means 40 connected at their one end to main support frame 11 and at their opposite end to charger plate support means support structure 21. Jacking means 40 comprises front jacking means 41 beneath and pivotally connected to a front region of charger plate support means 20 and rear jacking means 42 beneath and pivotally connected to a rear region of charger plate support means 20. Front jacking means 41 and rear jacking means 42 may be any suitable mechanical, pneumatic or hydraulic mechanism known to the art for movement of charger plate support means 20 with respect to main support frame 11. In preferred embodiments, heavy duty screw jacks have been found suitable. In preferred embodiments, a plurality of front jacks, 2 to about 4 individual jacks, may be used, dependent upon the size of the solids feeder, most directly the width, and the nature and weight of solids upon the charger plate. In the drawing, FIG. 3 shows front jacks 43 and 44 located at opposite side regions of charger plate support structure 21. Front jacking means 41 using screw type individual jacks can be controlled by rotatable shaft 45 which is force transmittingly connected to each front jack 43 and 44 in any manner known to the art for advancing and retracting the jack for controlling all of the individual front jacks in front jacking means 41 in unison. Rotatable shaft 45 may extend to the exterior of one side of main support frame 11 and may have handle 46 to enable easy manual rotation. It is readily apparent that the individual front jacks 43 and 44 may be controlled separately by a separate similar rotatable shaft 51 and 52, respectively, to each jack, when desired for additional control, as shown in FIG. 4.

Rear jacking means 42 may likewise comprise a plurality of individual jacks, usually from 2 to about 4, and be controlled in a manner as described above with respect to front jacking means 41. Rear jacking means 42 may also comprise a single rear jack 47, as best seen in FIG. 2, which may be controlled by rotatable shaft 48 force transmittingly connected to rear jack 47. Rotatable shaft 48 may extend to the exterior of one side of main support frame 11 and may have handle 49 to enable easy manual rotation.

When two front jacks and a single rear jack are positioned as shown in the drawing, charger plate support means 20 may be readily raised vertically to control the height of the drop of solid material into the reactor, may have its angular relation to the horizontal changed in a front-to-rear manner to control the rate of feed of solid material to the reactor, and may have its angular relation to the horizontal changed in a side-to-side manner to control the profile of feed of solid material to the reactor. Likewise, two rear jacks may be controlled in an individual separate manner to achieve all of the above movements, if desired. One important feature of the present invention, as compared with prior art apparatus, is the considerable reduction in number of jacks necessary for greater and broader adjustment of the charger plate.

While adjustment of the jacking means has been described above in detail with respect to mechanical means for adjustment it is readily apparent that the jacking means may be controlled by electric, hydraulic or pneumatic means known to the art.

Further control of feeding of the solids to the reactor is obtained by vertically adjustable gates 15 which may be raised or lowered to control the height and the profile of solids on the solids charger plate. It is preferred that adjustable gates 15 be controlled by shaftlever linkage without any gearing from the same side of the charger as the jacking means so that all adjustment controls are on the same side of the charger apparatus. It is readily seen that in the apparatus of this invention the controls may easily be located on either side of the charger so that two chargers having controls on opposite sides may be placed in close side-to-side relation to each other for even feeding of solids to a wide reactor opening.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of the invention.

I claim:

1. In a solids charger for feeding granular solid material to a reactor, said solids charger of the type having a main support frame and a solids supply chute thereabove feeding solids to a reciprocable charger plate vertically and angularly adjustable with respect to the horizontal and positioned under said solids supply chute for receiving the solids toward the rear end of said reciprocable charger plate and feeding the solids to the reactor from the front end of said reciprocable charger plate, the improvement comprising: said reciprocable charger plate reciprocably mounted in fixed angular relation to a charger plate support means; reciprocating drive means fixedly mounted to said charger plate support means and connected by an adjustable connecting rod means with the rear end of said reciprocable charger plate, said connecting rod means reciprocable generally parallel to the plane of said charger plate; and jacking means connected at one end to said main support frame and at the opposite end to said charger plate support means, said jacking means comprising front jacking means beneath and pivotably connected to a front region of said charger plate support means and rear jacking means beneath and pivotably connected to a rear region of said charger plate support means for independently raising and lowering said front and rear ends of said charger plate.

2. In a solids charger according to claim 1 wherein said front jacking means comprises a plurality of front jacks and said rear jacking means comprises a plurality of rear jacks.

3. In a solids charger according to claim 2 wherein said front jacking means is controlled by a rotatable shaft force transmittingly connected to each front jack comprised in said front jacking means for controlling all of said front jacks in unison and said rear jacking means is controlled by a second rotatable shaft force transmittingly connected to each rear jack comprised in said rear jacking means for controlling all of said rear jacks in unison.

4. In a solids charger according to claim 2 wherein said front jacking means comprises 2 to 4 front jacks and said rear jacking means comprises 2 to 4 rear jacks.

5. In a solids charger according to claim 1 wherein said front jacking means comprises a plurality of front jacks and said rear jacking means comprises a single rear jack.

6. In a solids charger according to claim 5 wherein said front jacking means comprises two front jacks, each at opposite side regions of said charger plate support means, and said rear jacking means comprises a single rear jack in a central region of said charger plate support.

7. In a solids charger according to claim 5 wherein said front jacking means is controlled by a rotatable shaft force transmittingly connected to each front jack comprised in said front jacking means for controlling all of said front jacks in unison.

8. In a solids charger according to claim 5 wherein said front jacking means is controlled by a separate rotatable shaft force transmittingly connected to each front jack comprised in said front jacking means for controlling each of said front jacks separately.

9. In a batch charger for feeding raw batch material to a glass melter, said batch charger of the type having a main support frame and a raw batch supply chute therabove feeding raw batch to a reciprocable charger plate vertically and angularly adjustable with respect to the horizontal and positioned under said raw batch supply chute for receiving the raw batch toward the rear end of said reciprocable charger plate and feeding the raw batch to the glass melter from the front end of said reciprocable charger plate, the improvement comprising: said reciprocable charger plate reciprocably mounted in fixed angular relation to a charger plate support means; reciprocating drive means fixedly mounted to said charger plate support means and connected by an adjustable connecting rod means with the rear end of said reciprocable charger plate, said connecting rod reciprocating generally parallel to the plane of said charger plate; and jacking means connected at one end to said main support frame and at the opposite end to said charger plate support means, said jacking means comprising front jacking means beneath and pivotably connected to a front region of said charger plate support means and rear jacking means beneath and pivotably connected to a rear region of said charger plate support means for independently raising and lowering said front and rear ends of said charger plate.

10. In a batch charger according to claim 9 wherein said front jacking means comprises a plurality of front jacks and said rear jacking means comprises a plurality of rear jacks.

11. In a batch charger according to claim 10 wherein said front jacking means is controlled by a rotatable shaft force transmittingly connected to each front jack comprised in said front jacking means for controlling all of said front jacks in unison and said rear jacking means is controlled by a second rotatable shaft force transmittingly connected to each rear jack comprised in said rear jacking means for controlling all of said rear jacks in unison.

12. In a batch charger according to claim 10 wherein said front jacking means comprises 2 to 4 front jacks and said rear jacking means comprises 2 to 4 rear jacks.

13. In a batch charger according to claim 9 wherein said front jacking means comprises a plurality of front jacks and said rear jacking means comprises a single rear jack.

14. In a batch charger according to claim 13 wherein said front jacking means comprises two front jacks, each at opposite side regions of said charger plate support means, and said rear jacking means comprises a single rear jack in a central region of said charger plate support.

15. In a batch charger according to claim 13 wherein said front jacking means is controlled by a rotatable shaft force transmittingly connected to each front jack comprised in said front jacking means for controlling all of said front jacks in unison.

16. In a batch charger according to claim 13 wherein said front jacking means is controlled by a separate rotatable shaft force transmittingly connected to each front jack comprised in said front jacking means for controlling each of said front jacks separately.

* * * * *